United States Patent
Turney

(10) Patent No.: US 11,692,780 B2
(45) Date of Patent: *Jul. 4, 2023

(54) HEAT EXCHANGERS

(71) Applicant: Hamilton Sundstrand Corporation, Charlotte, NC (US)

(72) Inventor: Joseph Turney, Amston, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,145

(22) Filed: Feb. 15, 2021

(65) Prior Publication Data
US 2021/0164739 A1 Jun. 3, 2021

Related U.S. Application Data

(60) Continuation of application No. 16/117,374, filed on Aug. 30, 2018, now Pat. No. 10,921,071, which is a
(Continued)

(51) Int. Cl.
*B23P 15/26* (2006.01)
*F28F 13/08* (2006.01)
(Continued)

(52) U.S. Cl.
CPC ............. *F28F 13/08* (2013.01); *B23P 15/26* (2013.01); *F28D 7/103* (2013.01); *F28D 7/106* (2013.01);
(Continued)

(58) Field of Classification Search
CPC .. F28F 1/006; F28F 1/022; F28F 1/025; F28F 1/06; Y10T 29/49384
See application file for complete search history.

(56) References Cited

U.S. PATENT DOCUMENTS 2,189,704 A 2/1940 Campbell
3,228,464 A 1/1966 Stein
(Continued)

FOREIGN PATENT DOCUMENTS

CN 107606982 B 6/2019
DE 102007044980 A1 3/2008
(Continued)

OTHER PUBLICATIONS

Extended European Search Report dated Jun. 7, 2022 issued in related European Application No. 22174920.3.
(Continued)

*Primary Examiner* — Jason L Vaughan
*Assistant Examiner* — Amanda Kreiling
(74) *Attorney, Agent, or Firm* — Locke Lord LLP; Scott D. Wofsy; Alicia J. Carroll

(57) ABSTRACT

A counter-flow heat exchanger comprising a heat exchanger core including an inner wall and an outer wall radially outward and spaced apart from the inner wall. A first flow path is defined within the inner wall and a second flow path is defined between the inner wall and the outer wall. The heat exchanger core includes a primary flow inlet, a primary flow outlet and a middle portion therebetween. The inner and outer walls are concentric at the primary flow inlet of the heat exchanger core. The inner wall defines a first set of channels extending axially from the primary flow inlet to the middle portion of the heat exchanger core diverging away from a radial center of the heat exchanger core. The inner wall and the outer wall define a second set of channels extending axially from the primary flow inlet to the middle portion of the heat exchanger core converging toward the radial center of the heat exchanger core.

20 Claims, 4 Drawing Sheets

Related U.S. Application Data division of application No. 14/993,843, filed on Jan. 12, 2016, now Pat. No. 10,088,250.

(51) Int. Cl.

| | | |
|---|---|---|
| *F28D 7/10* | (2006.01) | |
| *F28F 1/02* | (2006.01) | |
| *F28F 1/06* | (2006.01) | |
| *F28F 1/00* | (2006.01) | |

(52) U.S. Cl.
CPC .............. *F28F 1/006* (2013.01); *F28F 1/022* (2013.01); *F28F 1/025* (2013.01); *F28F 1/06* (2013.01); *F28F 2210/02* (2013.01); *Y10T 29/49384* (2015.01)

(56) References Cited

U.S. PATENT DOCUMENTS

| | | |
|---|---|---|
| 3,323,586 A | 6/1967 | Burne |
| 3,474,513 A | 10/1969 | Allingham |
| 3,493,041 A | 2/1970 | Hourwitz et al. |
| 3,818,984 A | 6/1974 | Nakamura et al. |
| 4,096,616 A | 6/1978 | Coffinberry |
| 4,343,354 A | 8/1982 | Weber |
| 4,609,039 A | 9/1986 | Fushiki et al. |
| 7,128,136 B2 | 10/2006 | Gregory |
| 7,496,285 B2 | 2/2009 | Molavi |
| 8,235,101 B2 | 8/2012 | Taras et al. |
| 8,289,710 B2 | 10/2012 | Spearing et al. |
| 10,088,250 B2 * | 10/2018 | Turney .................... F28F 1/06 |
| 10,145,624 B2 | 12/2018 | Rhee et al. |
| 10,406,601 B2 | 9/2019 | Martin et al. |
| 10,612,414 B2 | 4/2020 | Roberge |
| 10,866,030 B2 | 12/2020 | Sobolak et al. |
| 10,921,071 B2 | 2/2021 | Turney |
| 2009/0260586 A1 * | 10/2009 | Geskes ................. F02M 26/22 123/41.48 |
| 2011/0232885 A1 | 9/2011 | Kaslusky et al. |
| 2012/0285660 A1 | 11/2012 | Poltorak |
| 2014/0284038 A1 | 9/2014 | Vedula et al. |
| 2014/0345837 A1 | 11/2014 | Alahyari et al. |
| 2017/0138670 A1 | 5/2017 | Penny et al. |
| 2020/0189046 A1 | 6/2020 | Ravindranath et al. |

FOREIGN PATENT DOCUMENTS

| | | |
|---|---|---|
| FR | 2395480 A2 | 1/1979 |
| GB | 1032990 A | 6/1966 |
| GB | 2521913 A | 7/2015 |

OTHER PUBLICATIONS

Extended Search Report dated May 17, 2017 in connection with EP Publication No. 16207348.

Extended European Search Report dated Nov. 27, 2018, issued during the prosecution of corresponding European Patent Application No. EP 18191192.6 (12 pages).

Extended European Search Report dated Aug. 30, 2022 issued in connection with EP Patent Application No. 22167678.6.

* cited by examiner

HEAT EXCHANGERS

CROSS-REFERENCE TO RELATED APPLICATIONS

This application is a continuation application of U.S. patent application Ser. No. 16/117,374, filed Aug. 30, 2018, which is a divisional application of U.S. patent application Ser. No. 14/993,843 filed Jan. 12, 2016, issued as U.S. Pat. No. 10,088,250. The contents of each above referenced application are incorporated by reference herein in their entirety.

BACKGROUND OF THE INVENTION

1. Field of the Invention

The present invention relates to heat exchangers, and, in particular, to a cylindrical counter-flow heat exchanger.

2. Description of Related Art

Heat exchangers are used in a variety of systems, for example, in engine and environmental control systems of aircraft. These systems tend to require continual improvement in heat transfer performance, reductions in pressure loss, and reductions in size and weight. Heat exchangers typically include a plate/fin construction in the core of the heat exchanger.

Such conventional methods and systems have generally been considered satisfactory for their intended purpose. However, there is still a need in the art for systems and methods that allow for improved heat exchangers. The present invention provides a solution for these problems.

SUMMARY OF THE INVENTION

A counter-flow heat exchanger comprising a heat exchanger core including an inner wall and an outer wall radially outward and spaced apart from the inner wall. A first flow path is defined within the inner wall and a second flow path is defined between the inner wall and the outer wall. The heat exchanger core includes a primary flow inlet, a primary flow outlet and a middle portion therebetween. The inner and outer walls are concentric at the primary flow inlet of the heat exchanger core. The inner wall defines a first set of channels extending axially from the primary flow inlet to the middle portion of the heat exchanger core diverging away from a radial center of the heat exchanger core. The inner wall and the outer wall define a second set of channels extending axially from the primary flow inlet to the middle portion of the heat exchanger core converging toward the radial center of the heat exchanger core.

In accordance with certain embodiments, the inner wall is corrugated to form the first and second sets of channels. Respective channels of the first and second sets of channels can alternate circumferentially with one another. The heat exchanger core can be a circular cylinder. At the primary flow inlet of the heat exchanger core, in a cross-section taken perpendicular to a primary flow direction, the inner and outer walls can define an annulus therebetween including the second flow path. A diameter of the heat exchanger core at the primary flow inlet can be smaller than a diameter of the heat exchanger core in the middle portion. At least one channel of the first set of channels can split into multiple sub-channels to maintain a width smaller than a maximum threshold. At least two channels of the second set of channels can unite into a single joined channel to maintain a width greater than a minimum threshold.

It is contemplated that at least one of the first and second flow paths can include vanes to assist with flow distribution. The heat exchanger core can be substantially linear and can define a longitudinal axis between the primary flow inlet and the primary flow outlet. A radial center of the inner wall can be aligned with the longitudinal axis. Additional cylindrical walls can be disposed radially inward from the outer wall and concentric with the heat exchanger core. The additional cylindrical walls can be radially spaced apart from one another and are in fluid communication with the first and second flow paths. Annular ring sections can be defined between two adjacent cylindrical walls. Each annular ring section can include a portion of a channel from the first set of channels and a portion of a channel from the second set of channels. The portion from the first set of channels in a first annular ring section can be offset radially and circumferentially from the portion from the first set of channels in a second annular ring section. The second annular ring section can be adjacent to the first annular ring section. The portion from the second set of channels in the first annular ring section can be offset radially and circumferentially from the portion from the second set of channels in the second annular ring section. The additional cylindrical walls can be circular cylindrical walls. The additional cylindrical walls can be disposed in the middle portion of the heat exchanger core. The inner and outer walls can be concentric at the primary flow outlet of the heat exchanger core.

The heat exchanger core can be cylindrical, wherein at an outlet of the heat exchanger core, in a cross-section taken perpendicular to a primary flow direction, an annulus can be defined between the inner and outer walls. From the middle portion of the heat exchanger core to the primary flow outlet, the first set of channels can extend axially away from the middle portion to the primary flow outlet converging toward the radial center of the heat exchanger core and the second set of channels can extend axially away from the middle portion to the primary flow outlet diverging away from the radial center of the heat exchanger core. In accordance with another aspect, a method of manufacturing a counter-flow heat exchanger core includes forming a heat exchanger core body using additive manufacturing. The heat exchanger core body is similar to the heat exchanger core described above. Additive manufacturing can be via direct metal laser sintering.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
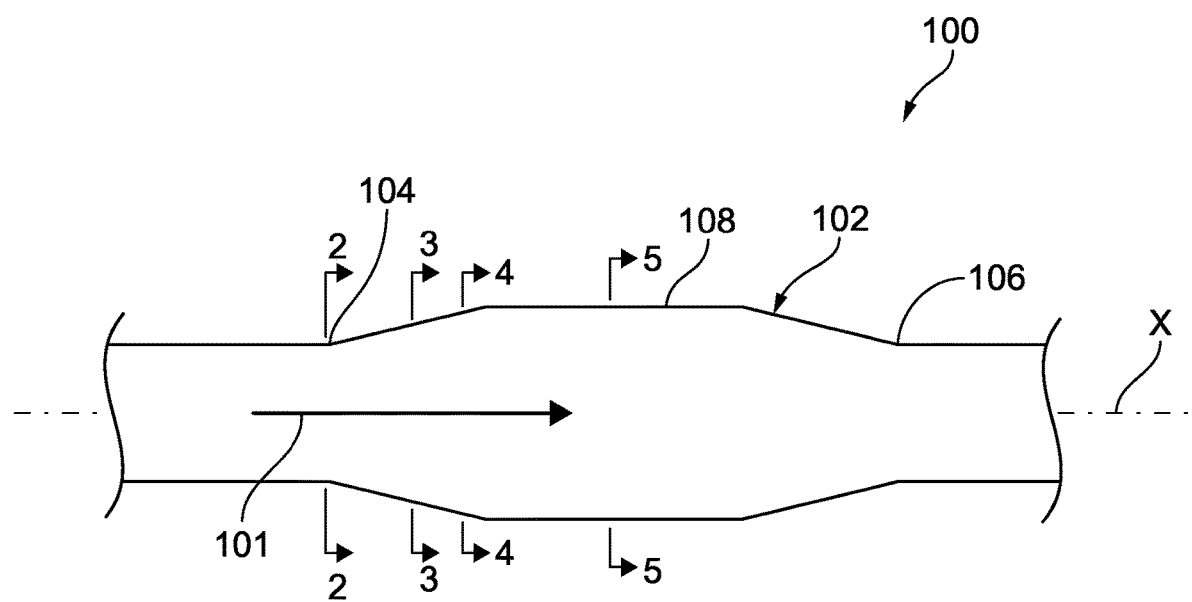
FIG. 1 is a top view of a schematic depiction of an exemplary embodiment of a counter flow heat exchanger, showing the heat exchanger core and the primary flow direction.

Reference will now be made to the drawings wherein like reference numerals identify similar structural features or aspects of the subject disclosure. For purposes of explanation and illustration, and not limitation, a perspective view of an exemplary embodiment of a heat exchanger in accordance with the disclosure is shown in FIG. 1 and is designated generally by reference character 100. Other embodiments of imaging systems in accordance with the disclosure, or aspects thereof, are provided in FIGS. 2-5, as will be described. Embodiments of heat exchanger 100 provide a fractal heat exchanger core that results in increased performance, and reduced size and weight as compared with traditional plate fin heat exchangers.

As shown in FIG. 1, a counter-flow heat exchanger 100 includes a heat exchanger core 102 that defines a longitudinal axis X. Heat exchanger core 102 includes a primary flow inlet 104, a primary flow outlet 106 and a middle portion 108 therebetween. The primary flow direction is indicated schematically by the arrow 101. Heat exchanger core 102 is circular cylinder that includes conical tapering portions at its inlet and outlet, 104 and 106, respectively. A diameter of heat exchanger core 102 at primary flow inlet 104 is smaller than a diameter of the heat exchanger core 102 in middle portion 108. It is also contemplated that the diameter of core 102 at inlet 104 and in middle portion 108 can be the same, e.g. core 102 can have a constant diameter. Heat exchanger core 102 has circular cross-sections along its length, e.g. those taken perpendicular to the flow direction and longitudinal axis X. It is contemplated that heat exchanger core 102 can have a variety of other suitable shapes, for example, it can be an oval cylinder, an elliptical cylinder, a rectangular cylinder, or a square cylinder. In accordance with some embodiments, additional elliptically shaped walls, similar to additional walls 130 can be used inside a rectangular cylinder core. The heat exchanger core is substantially linear and defines a longitudinal axis between the primary flow inlet and the primary flow outlet. A radial center of the inner wall is aligned with the longitudinal axis.

Figure 2:
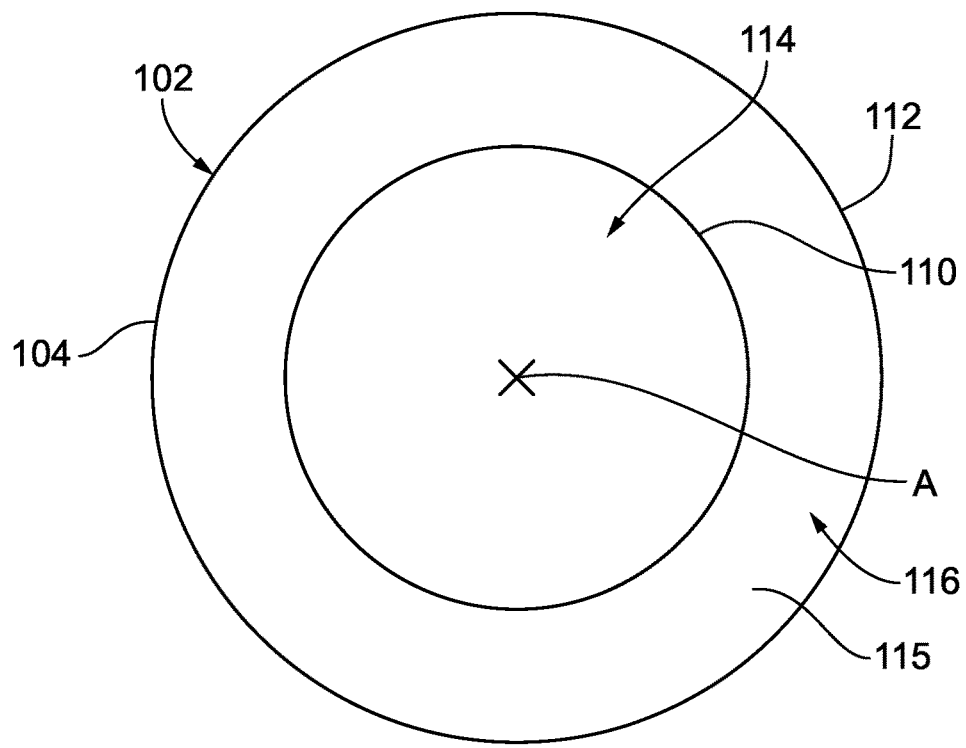
FIG. 2 is a schematic cross-sectional view of the heat exchanger of FIG. 1 at the primary flow inlet of the heat exchanger core, showing inner and outer walls and an annulus formed therebetween.

As shown in FIG. 2, a cross-section of heat exchanger core 102 at primary flow inlet 104 is shown. At primary flow inlet 104, heat exchanger core 102 includes an inner wall 110 and an outer wall 112 radially outward and spaced apart from inner wall 110. A first flow path 114 is defined within inner wall 110 and a second flow path 116 is defined between inner wall 110 and outer wall 112. Inner and outer walls, 110 and 112, respectively, define an annulus 115 that includes second flow path 116. Inner and outer walls 110 and 112, respectively, are cylindrical and concentric at primary flow inlet 104 of heat exchanger core 102. Inner and outer walls, 110 and 112, respectively, are concentric at primary flow outlet of the heat exchanger core.

Figure 3:
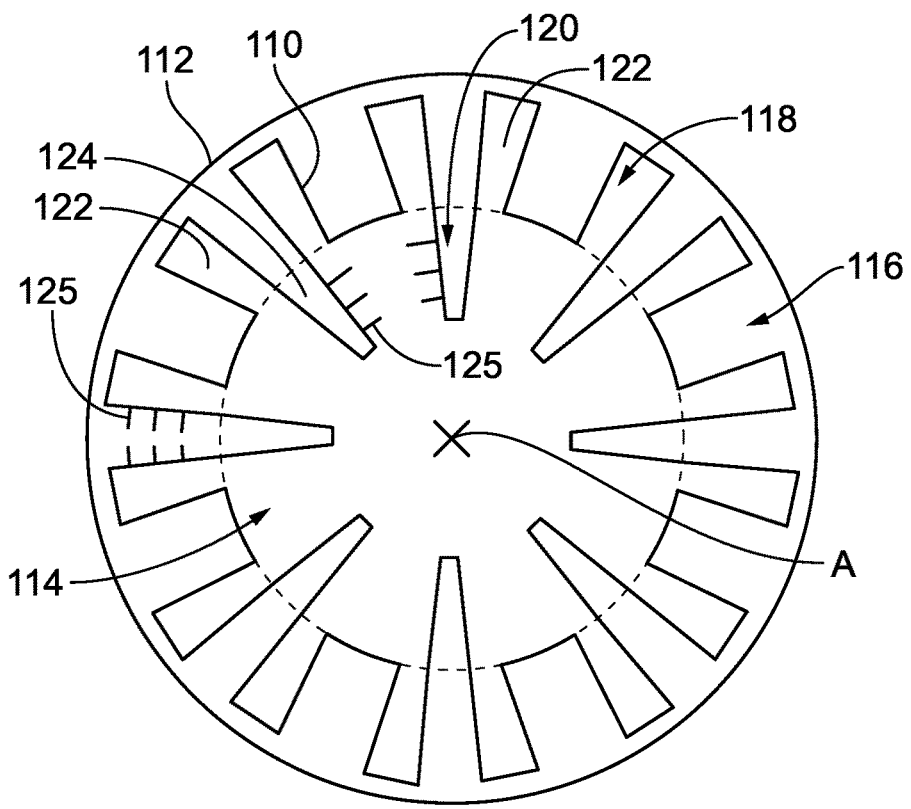
FIG. 3 is a schematic cross-sectional view of the heat exchanger of FIG. 1 between the primary flow inlet of the heat exchanger core and a middle portion of the heat exchanger core, showing the converging and diverging sets of channels.

As shown in FIG. 3, as inner wall 110 extends away from primary flow inlet 104 it becomes corrugated and defines a first set of channels 118 extending axially from primary flow inlet 104 to middle portion 108 of heat exchanger core 102 diverging away from a radial center A of heat exchanger core 102. Inner wall 110 and outer wall 112 define a second set of channels 120 extending axially from primary flow inlet 104 to middle portion 108 of heat exchanger core 102 converging toward radial center A of heat exchanger core 102. Respective channels 122 and 124 of the first and second sets of channels 118 and 120, respectively, alternate circumferentially with one another to provide additional surface area for heat transfer. In accordance with the embodiment of FIG. 3, two channels 122 from first set of channels 118 alternate with one channel 124 from second set of channels 120. First and second flow paths 114 and 116, respectively, include vanes 125 to assist with flow distribution with only minimal pressure drop.

Figure 4:
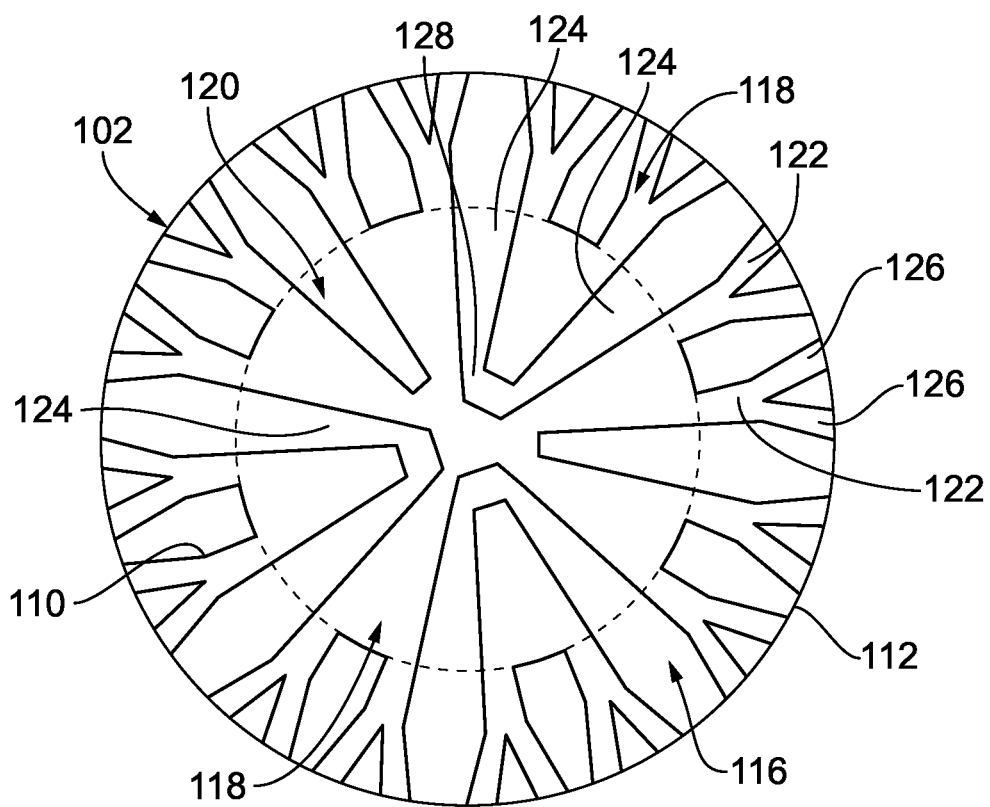
FIG. 4 is a schematic cross-sectional view of the heat exchanger of FIG. 1 between the primary flow inlet of the heat exchanger core and a middle portion of the heat exchanger core, showing the channels of the first set of channels separating into sub-channels.

With reference now to FIG. 4, as inner wall 110 extends further axially away from flow inlet 104 toward and into middle portion 108, channels 122 of the first set of channels 118 split into multiple sub-channels 126 to maintain a width smaller than a maximum threshold. At least two channels 124 of the second set of channels 120 unite into a single joined channel 128 to maintain a width greater than a minimum threshold.

Figure 5:
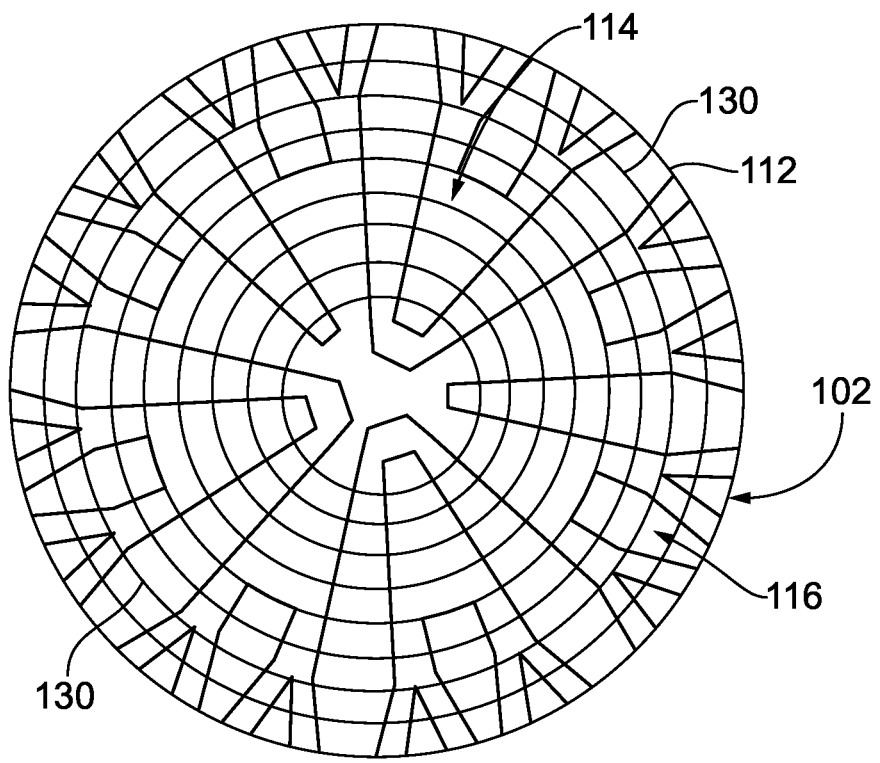
FIG. 5 is a schematic cross-sectional view of the heat exchanger of FIG. 1 in the middle portion of the heat exchanger core, showing the additional cylindrical walls.

As shown in FIG. 5, additional cylindrical walls 130 are disposed radially inward from outer wall 112 and are concentric with heat exchanger core 102. Additional cylindrical walls 130 are radially spaced apart from one another and are in fluid communication with first and second flow paths 114 and 116, respectively. Additional cylindrical walls 130 are circular cylindrical walls. Additional cylindrical walls 130 are disposed in middle portion 108 of the heat exchanger core 102. It is also contemplated that additional cylindrical walls like cylindrical walls 130 could be used in other portions of heat exchanger core 102.

Figure 6:
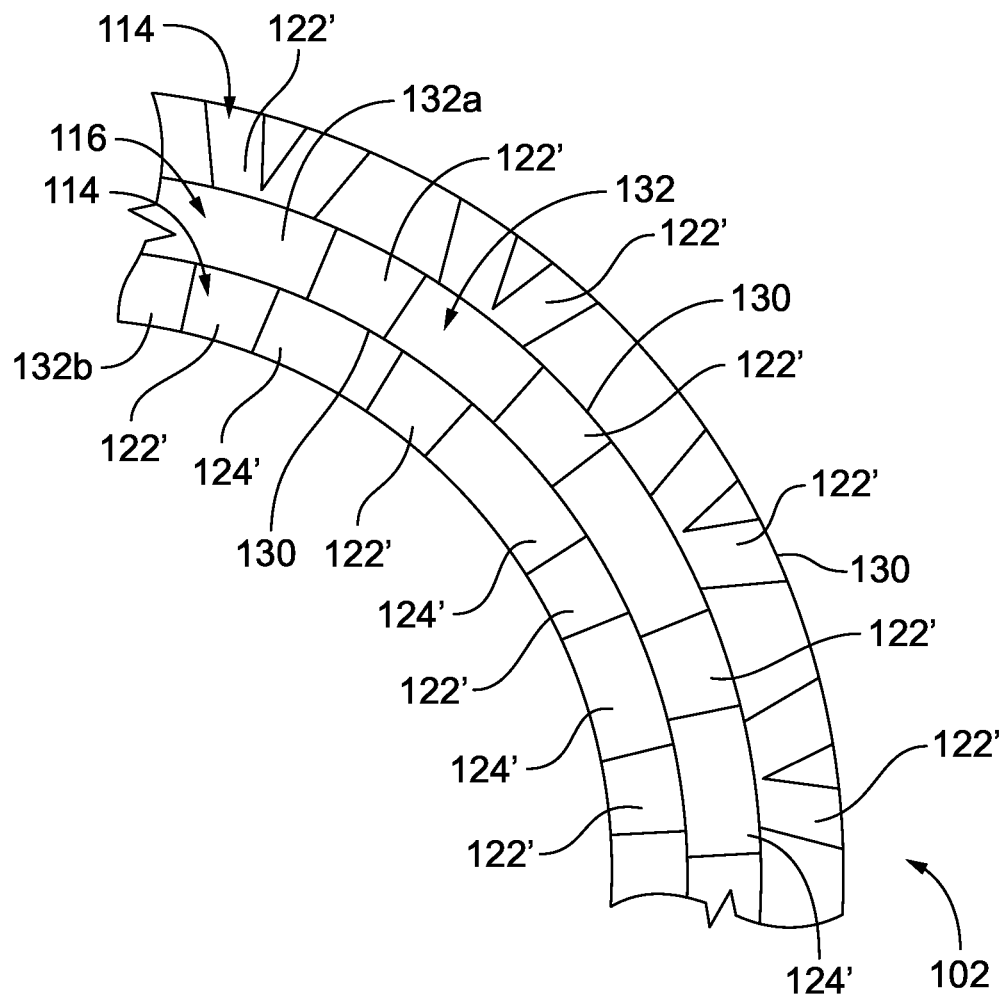
FIG. 6 is a schematic cross-sectional view of a portion of the heat exchanger of FIG. 1 in the middle portion of the heat exchanger core, showing adjacent annular sections between the additional cylindrical walls off-set from one another.

As shown in FIG. 6, in accordance with an embodiment of core 102, annular ring sections 132 are defined between two adjacent additional walls 130 are circumferentially offset with respect to an adjacent annular ring so that a checker-board pattern is formed, e.g. alternating first and second flow paths 114 and 116, respectively, in a radial direction as well as in a circumferential direction. The cross-section of FIG. 6 is taken at a similar location as the cross-section of FIG. 5. Each annular ring section 132 includes a portion 122' of one of channels 122 from first set of channels 118 and a portion 124' of one of channels 124 from second set of channels 120. Portion 122' from first set of channels 118 in a first annular ring section 132a is offset radially and circumferentially from portion 122' from first set of channels 118 in a second annular ring 132b section. Second annular ring section 132b is adjacent to first annular ring section 132a. Portion 124' from the second set of channels 120 in first annular ring section 132a is offset radially and circumferentially from portion 124' from second set of channels 120 in second annular ring section 132b.

With reference now to FIGS. 1-5, at outlet 106 of the heat exchanger core 102 inner and outer walls 110, and 112, respectively, are similar to how they were arranged at inlet 104, shown in FIG. 2, e.g. at a cross-section taken perpendicular to longitudinal axis X at outlet 106 inner and outer walls 110, and 112, respectively, would be concentric circles. To transition back to concentric circles, from middle portion 108 of the heat exchanger core 102 to primary flow outlet 106, the first set of channels 118 extends axially away from middle portion 108 to the primary flow outlet 106 converging back toward radial center A of heat exchanger core 102 and second set of channels 120 extends axially away from middle portion 108 to primary flow outlet 106 diverging away from radial center A of the heat exchanger core. By utilizing a counter-flow configuration, heat exchanger 100 provides for reduced size and increased performance by better balancing the hot and cold fluids running through core 102, e.g. through first and second flow paths 114 and 116, respectively. Heat exchanger 100 also increases the heat exchanger effectiveness for a given overall heat transfer area. The counter-flow configuration enables high temperature and high pressure operation by reducing the temperature differential across the heat exchanger planform since the cold side outlet and hot side inlet are aligned with one another. By gradually transitioning from the inlet 104, as shown in FIG. 2, to the core 108, as shown in FIG. 5, pressure drops can be reduced and there is not a large discontinuity in stiffness or thermal response as in traditional headering.

It is contemplated that a method of manufacturing a counter-flow heat exchanger core, e.g. heat exchanger core 102, includes forming heat exchanger core 102 using additive manufacturing such as, direct metal laser sintering, for example. It is contemplated that the heat exchanger core can be manufactured in the flow direction, e.g. along longitudinal axis X to avoid horizontal surfaces. It is also contemplated that instead of being a linearly extending cylinder, the heat exchanger could be built along a sinusoidal path creating wavy or ruffled sets of channels as opposed to straight ones for increased heat transfer or bend around obstructions.

The methods and systems of the present disclosure, as described above and shown in the drawings, provide for heat exchangers with superior properties including improved heat transfer resulting from a larger primary flow area, with a relatively small amount of secondary flow area. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein the heat exchanger core is a circular cylinder, wherein at the primary flow inlet of the heat exchanger core, in a cross-section taken perpendicular to a primary flow direction, the inner and outer walls define an annulus therebetween including the second flow path.

2. The counter-flow heat exchanger as recited in claim 1, wherein the inner wall is corrugated to form the first and second sets of channels, wherein respective channels of the first and second sets of channels alternate circumferentially with one another.

3. The counter-flow heat exchanger as recited in claim 1, wherein a diameter of the heat exchanger core at the primary flow inlet is smaller than a diameter of the heat exchanger core in the middle portion.

4. The counter-flow heat exchanger as recited in claim 1, further comprising additional cylindrical walls disposed radially inward from the outer wall and concentric with the heat exchanger core, wherein the additional cylindrical walls are radially spaced apart from one another and are in fluid communication with the first and second flow paths.

5. The counter-flow heat exchanger as recited in claim 4, wherein the additional cylindrical walls are circular cylindrical walls.

6. The counter-flow heat exchanger as recited in claim 4, wherein the additional cylindrical walls are disposed in the middle portion of the heat exchanger core.

7. The counter-flow heat exchanger as recited in claim 4, wherein annular ring sections are defined between two adjacent cylindrical walls, wherein each annular ring section includes a portion of a channel from the first set of channels and a portion of a channel from the second set of channels, wherein the portion from the first set of channels in a first annular ring section is offset radially and circumferentially from the portion from the first set of channels in a second annular ring section, wherein the second annular ring section is adjacent to the first annular ring section, and wherein the portion from the second set of channels in the first annular ring section is offset radially and circumferentially from the portion from the second set of channels in the second annular ring section.

8. The counter-flow heat exchanger as recited in claim 1, wherein at least one channel of the first set of channels splits into multiple sub-channels to maintain a width smaller than a maximum threshold.

9. The counter-flow heat exchanger as recited in claim 1, wherein at least two channels of the second set of channels unite into a single joined channel to maintain a width greater than a minimum threshold.

10. The counter-flow heat exchanger as recited in claim 1, wherein at least one of the first and second flow paths include vanes to assist with flow distribution.

11. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein at least one channel of the first set of channels splits into multiple sub-channels to maintain a width smaller than a maximum threshold.

12. The counter-flow heat exchanger as recited in claim 11, wherein the heat exchanger core is a circular cylinder, wherein at the primary flow inlet of the heat exchanger core, in a cross-section taken perpendicular to a primary flow direction, the inner and outer walls define an annulus therebetween including the second flow path.

13. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein at least two channels of the second set of channels unite into a single joined channel to maintain a width greater than a minimum threshold.

14. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein at least one of the first and second flow paths include vanes to assist with flow distribution.

15. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein the heat exchanger core is substantially linear and defines a longitudinal axis between the primary flow inlet and the primary flow outlet, wherein a radial center of the inner wall is aligned with the longitudinal axis.

16. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein the inner and outer walls are concentric at the primary flow outlet of the heat exchanger core.

17. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein the heat exchanger core is cylindrical, wherein at an outlet of the heat exchanger core, in a cross-section taken perpendicular to a primary flow direction, an annulus is defined between the inner and outer walls.

18. A counter-flow heat exchanger comprising:
a heat exchanger core including an inner wall and an outer wall radially outward and spaced apart from the inner wall, wherein a first flow path is defined within the inner wall and a second flow path is defined between the inner wall and the outer wall, wherein the heat exchanger core includes a primary flow inlet, a primary flow outlet and a middle portion therebetween, wherein the inner and outer walls are concentric at the primary flow inlet of the heat exchanger core, wherein the inner wall defines a first set of channels extending axially from the primary flow inlet to the middle portion of the heat exchanger core diverging away from a radial center of the heat exchanger core, and wherein the inner wall and the outer wall define a second set of channels extending axially from the primary flow inlet to the middle portion of the heat exchanger core converging toward the radial center of the heat exchanger core, wherein, from the middle portion of the heat exchanger core to the primary flow outlet, the first set of channels extends axially away from the middle portion to the primary flow outlet converging toward the radial center of the heat exchanger core and the second set of channels extends axially away from the middle portion to the primary flow outlet diverging away from the radial center of the heat exchanger core.

19. A method of manufacturing a counter-flow heat exchanger core, the method comprising:

forming a heat exchanger core body using additive manufacturing, wherein the heat exchanger core body includes an inner wall and an outer wall radially outward and spaced apart from the inner wall, wherein a first flow path is defined within the inner wall and a second flow path is defined between the inner wall and the outer wall, wherein the heat exchanger core body includes a primary flow inlet, a primary flow outlet and a middle portion therebetween, wherein the inner and outer walls are concentric at the primary flow inlet of the heat exchanger core body, wherein the inner wall defines a first set of channels extending axially from the primary flow inlet to the middle portion of the heat exchanger core body diverging away from a radial center of the heat exchanger core body, and wherein the inner wall and the outer wall define a second set of channels extending axially from the primary flow inlet to the middle portion of the heat exchanger core body converging toward the radial center of the heat exchanger core body, wherein the heat exchanger core is a circular cylinder, wherein at the primary flow inlet of the heat exchanger core, in a cross-section taken perpendicular to a primary flow direction, the inner and outer walls define an annulus therebetween including the second flow path.

20. The method as recited in claim 19, wherein the additive manufacturing is via direct metal laser sintering.

* * * * *